US009297456B2

(12) United States Patent
Fodor et al.

(10) Patent No.: US 9,297,456 B2
(45) Date of Patent: Mar. 29, 2016

(54) VEHICLE ADAPTED TO CONTROL CLUTCH TORQUE BASED ON RELATIVE SPEED DATA

(71) Applicant: FORD GLOBAL TECHNOLOGIES, LLC, Dearborn, MI (US)

(72) Inventors: Michael Glenn Fodor, Dearborn, MI (US); Hongtei Eric Tseng, Canton, MI (US); Bradley Dean Riedle, Northville, MI (US); Davorin David Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 14/230,448

(22) Filed: Mar. 31, 2014

(65) Prior Publication Data
US 2015/0276050 A1 Oct. 1, 2015

(51) Int. Cl.
*F16H 61/04* (2006.01)
*F16H 61/00* (2006.01)
*F16H 59/46* (2006.01)

(52) U.S. Cl.
CPC ............ *F16H 61/0437* (2013.01); *F16H 59/46* (2013.01); *F16H 2059/465* (2013.01); *F16H 2061/0075* (2013.01); *F16H 2061/0087* (2013.01); *F16H 2061/0462* (2013.01)

(58) Field of Classification Search
CPC ................................................ F16H 2061/0075
See application file for complete search history.

(56) References Cited

U.S. PATENT DOCUMENTS

| 4,106,368 | A | * | 8/1978 | Ivey | 477/155 |
| 4,760,902 | A | * | 8/1988 | Bellanger | 477/172 |
| 4,967,620 | A | * | 11/1990 | Shimanaka | 477/155 |
| 5,452,207 | A |   | 9/1995 | Hrovat et al. | |
| 5,489,247 | A | * | 2/1996 | Markyvech et al. | 477/120 |
| 6,174,255 | B1 | * | 1/2001 | Porter | B60K 17/34 180/235 |
| 6,434,460 | B1 | * | 8/2002 | Uchino et al. | 701/37 |
| 7,559,259 | B2 |   | 7/2009 | Fruhwirth et al. | |
| 7,670,252 | B2 | * | 3/2010 | Wu et al. | 477/3 |

(Continued)

FOREIGN PATENT DOCUMENTS

EP 1619063 B1 1/2006
WO 2012154248 A1 11/2012

OTHER PUBLICATIONS

D. Li et al., Relative Torque Estimation on Transmission Output Shaft with Speed Sensors, SAE International, Apr. 12, 2011.

(Continued)

*Primary Examiner* — Ramya Burgess
*Assistant Examiner* — David Morris
(74) *Attorney, Agent, or Firm* — James Dottavio; Brooks Kushman P.C.

(57) ABSTRACT

The rate of change of transmission output torque is computed based on the differential speeds of the axles and of the transmission output shaft adjusting for final drive ratio. The speed of the axle is measured by an anti-lock braking system and communicated to the transmission controller over a communications bus. To compensate for the delay introduced by the communications bus, a shift register delays the signal from the transmission output shaft speed sensor. The resulting estimate of rate of change of transmission output torque may be used directly to control the torque capacity of one or more transmission clutches. Additionally, the resulting estimate may be combined with an independent output torque estimate to yield a more accurate output torque estimate.

14 Claims, 4 Drawing Sheets

(56) References Cited

U.S. PATENT DOCUMENTS

2007/0265756 A1 11/2007 Joyce et al.
2007/0294018 A1 12/2007 Nihanda
2009/0101428 A1 4/2009 Itoh

OTHER PUBLICATIONS

D. Li et al., Transmission Virtual torque Sensor—Absolute Torque Estimation, SAE International, Apr. 16, 2012.

* cited by examiner

VEHICLE ADAPTED TO CONTROL CLUTCH TORQUE BASED ON RELATIVE SPEED DATA

TECHNICAL FIELD

This disclosure relates to the field of automatic transmission controls. More particularly, the disclosure pertains to estimation of transmission output torque based on speed signals.

BACKGROUND

An automatic transmission establishes various power flow paths having different speed ratios by selectively engaging and disengaging a number of shift elements. The shift elements include friction clutches. The torque capacity of each friction clutch is determined based on a signal from a transmission controller. For example, a controller may send a pulse width modulated signal to a solenoid such that the electromagnetic force exerted by the solenoid is proportional to the pulse width. The solenoid valve may be connected to a spool valve in a valve body such that the hydraulic pressure in a particular passageway of the valve body is proportional to the electromagnetic force. Fluid from the passageway may be routed to a piston apply chamber of a clutch causing the piston to exert a force related to the fluid pressure. The piston force may squeeze friction plates between separator plates to establish a torque capacity of a clutch. Alternatively, the signal may influence the torque capacity by other mechanism such as causing a motor to rotate, thus causing a piston to apply force to a clutch pack. Due to the indirect causal chain between the signal and the clutch torque capacity, a number of unpredictable noise factors may influence the relationship.

When the controller determines that a speed ratio change is needed, the controller may execute a shift by releasing one shift element called an off-going element and engaging another shift element called an on-coming element. For the shift to feel smooth to vehicle occupants, it is important that the torque capacity of the on-coming element and the torque capacity of the off-going element be coordinated with respect to one another and with respect to the engine torque. For example, if the off-going clutch is released prematurely, then the driveshaft torque will drop excessively and the engine speed will rise. This phenomenon is called an engine flare. On the other hand, if the off-going element is released too late, then the two shift elements will resist one another and the output torque will drop excessively. This phenomenon is called a tie-up.

In order to adjust the control signals such that the torque capacities are proper in the presence of unknown noise factors, a controller may utilize a feedback signal. For example, a controller may utilize signals from an input speed sensor and an output speed sensor to compute the current speed ratio of the transmission. An unexpected or excessively large increase in the ratio of input speed to output speed may indicate an engine flare. In response to this information, the controller may increase the torque capacity of the on-coming shift element. However, some errors, such as a tie-up, are not necessarily reflected in the speed ratio. Furthermore, it takes time for an error in shift element torque capacity to show up as a change in the speed ratio. Therefore, it is desirable to supplement this information with a measurement of the transmission output torque.

SUMMARY OF THE DISCLOSURE

A vehicle includes a powertrain having an output shaft, left and right axles driveably connected to the output shaft through a gear ratio and a processor. The processor receives a first signals indicating a speed of the output shaft and a second signal indicating a speed of the axles. The second signal may indicate an average speed of the left and right axles or may indicate both speeds. The processor sends a third signal to alter a torque transmitted by the output shaft. For example, the third signal may adjust the torque capacity of a friction clutch. The processor is programmed to adjust the third signal based on a difference between the speed of the output shaft and the speed of the axle multiplied by the gear ratio. The second signal may be received from a communications bus that introduces some delay. To compensate for this delay, the processor may introduce delay into the first signal using a shift register. In some embodiments, the processor may integrate the relative speeds, adjusted for final drive ratio and use a high pass filter to filter low frequency content from the result.

A transmission controller includes a shift register and a processor. The shift register delays a first signal indicating rotation of a transmission output to temporally coincide with a delayed second signal indicating rotation of an axle. The transmission controller may vary the delay duration. The second signal may indicate the speed of the axle without indicating the position of the axle. The processor is programmed to adjust a torque capacity of a clutch based on a difference between the delayed first signal and a product of a gear ratio and the delayed second signal.

A method of controlling a transmission includes adjusting a torque capacity of a transmission clutch based on a difference between a first signal indicating a speed of a transmission output shaft and a product of a gear ratio and a second signal indicating a speed of an axle. The second signal may be received from a communications bus. The method may also include introducing a time delay in the first signal to compensate for a time delay receiving the second signal via the communications bus. The method may include integrating the speed differences, factoring in the gear ratio, and then filtering out low frequency content. The method may also include combining the resulting torque estimate with an independent estimate that provides the low frequency content.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
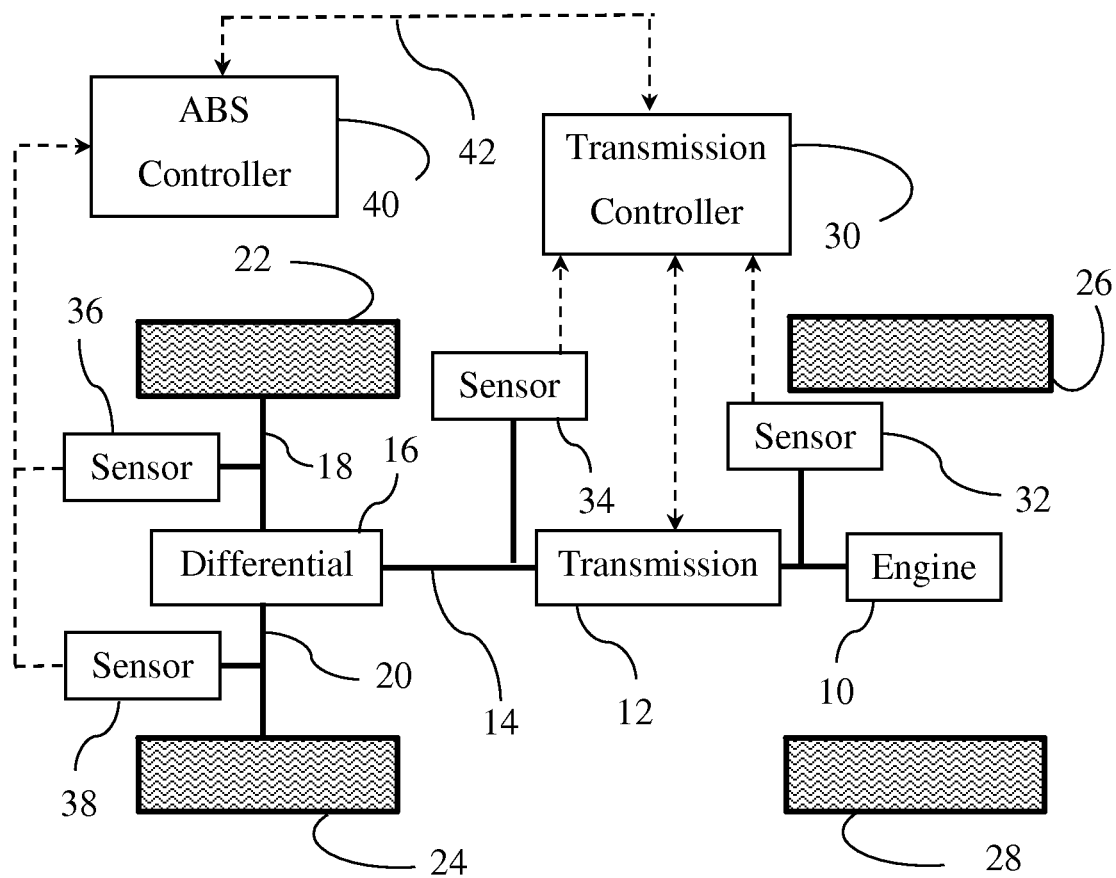
FIG. 1 is a schematic diagram of a vehicle.

FIG. 1 illustrates a vehicle adapted to adjust the torque capacity of a transmission clutch based on a torque estimate derived from multiple speed sensors. Mechanical connections are illustrated with solid lines while dotted lines represent signals that convey information. Power to propel the vehicle is generated by internal combustion engine 10. This power is conditioned to satisfy vehicle needs by transmission 12 and delivered to driveshaft 14. In particular, when the vehicle is at low speed, transmission 12 reduces the speed and multiplies the torque relative to the power provided by the engine. When the vehicle is at high speed, transmission 12 causes driveshaft 14 to rotate faster than the engine crankshaft. Differential 16 divides the power from driveshaft 14 between left and right axles 18 and 20 which drive left and right rear wheels 22 and 24 respectively. Differential 16 permits the two axles to rotate at slightly different speeds relative to one another when the vehicle turns a corner. Differential 16 also multiplies the driveshaft torque by a fixed ratio called the final drive ratio and changes the axis of rotation by 90 degrees. Left and right front wheels 26 and 28 respectively are not powered. Although FIG. 1 illustrates a rear wheel drive vehicle, the invention is also applicable to a front wheel drive configuration.

Transmission 12 establishes various power flow paths having different speed ratios by selectively engaging and disengaging a number of shift elements. Controller 30 adjusts the torque capacity of each friction clutch during shift events. For some types of transmissions, such as dual clutch transmissions, controller 30 also continuously adjusts the torque capacity of one of more clutches to launch the vehicle from a stationary position. Controller 30 may utilize signals from input speed sensor 32 and output speed sensor 34.

One method of estimating transmission output shaft torque is based on measuring vehicle acceleration. Vehicle acceleration is proportional to the tractive force minus drag force divided by the vehicle mass. Models may be available to estimate drag forces as a function of vehicle speed. The tractive force is proportional to the transmission output torque. Vehicle acceleration can be measured with an accelerometer or may be calculated by differentiating a speed measurement. Unfortunately, this method does not accurately capture short duration changes in output torque. Immediately following a change in transmission output torque, the amount of twist in various driveline components increases. Vehicle acceleration does not change until after the driveline twist has changed. Furthermore, vehicle acceleration is impacted by transient conditions unrelated to transmission output torque such as small bumps in the roadway. For these reasons, this method is inadequate as a feedback signal for controlling clutches during a transmission shift.

Transmission input torque can be estimated in several ways. For example, models may be available to estimate engine output torque based on engine speed, throttle setting, spark timing, etc. Alternatively, when the transmission is equipped with a torque converter and the bypass clutch is open, turbine torque may be estimated based on turbine speed and impeller speed. When the transmission gearbox is in a steady state condition, these estimates of transmission input torque may be the basis for estimating transmission output torque by multiplying by the known torque ratio. However, during a shift, the torque ratio is not accurately known.

When a shaft transmits torque, the shaft twists or winds up. In other words, the rotational position of one end of the shaft differs from the rotational position of the other end of the shaft by an amount proportional to the transmitted torque. Measuring this difference in rotational position provides an estimate of the transmitted torque. This difference may be estimated using output shaft speed sensor 34 and axles speed sensors 36 and 38 as described below. Axle speed sensors 36 and 38 are used by anti-lock braking (ABS) controller 40 to sense wheel slip and adjust the braking force accordingly. ABS controller 40 and transmission controller 30 communicate via controller area network 42.

The transmission output torque is proportional to the difference between the position at sensor 34 and the average position of sensors 36 and 38 corrected for the final drive ratio. Since the torque is proportional to the relative positions at these locations, the rate of change of torque is proportional to the relative speeds at these positions. A method to calculate the rate of change of output torque based on speed sensor readings is illustrated by the flow chart of FIG. 2. ABS controller 40 receives signals from speed sensors 36 and 38 at 50 and 52 respectively. Based on these readings, ABS controller 40 computes the average axle speed at 54 and posts the average speed to the CAN at 56. The Transmission controller receives this information from the CAN at 58 and multiplies it by the final drive ratio at 60.

Figure 2:
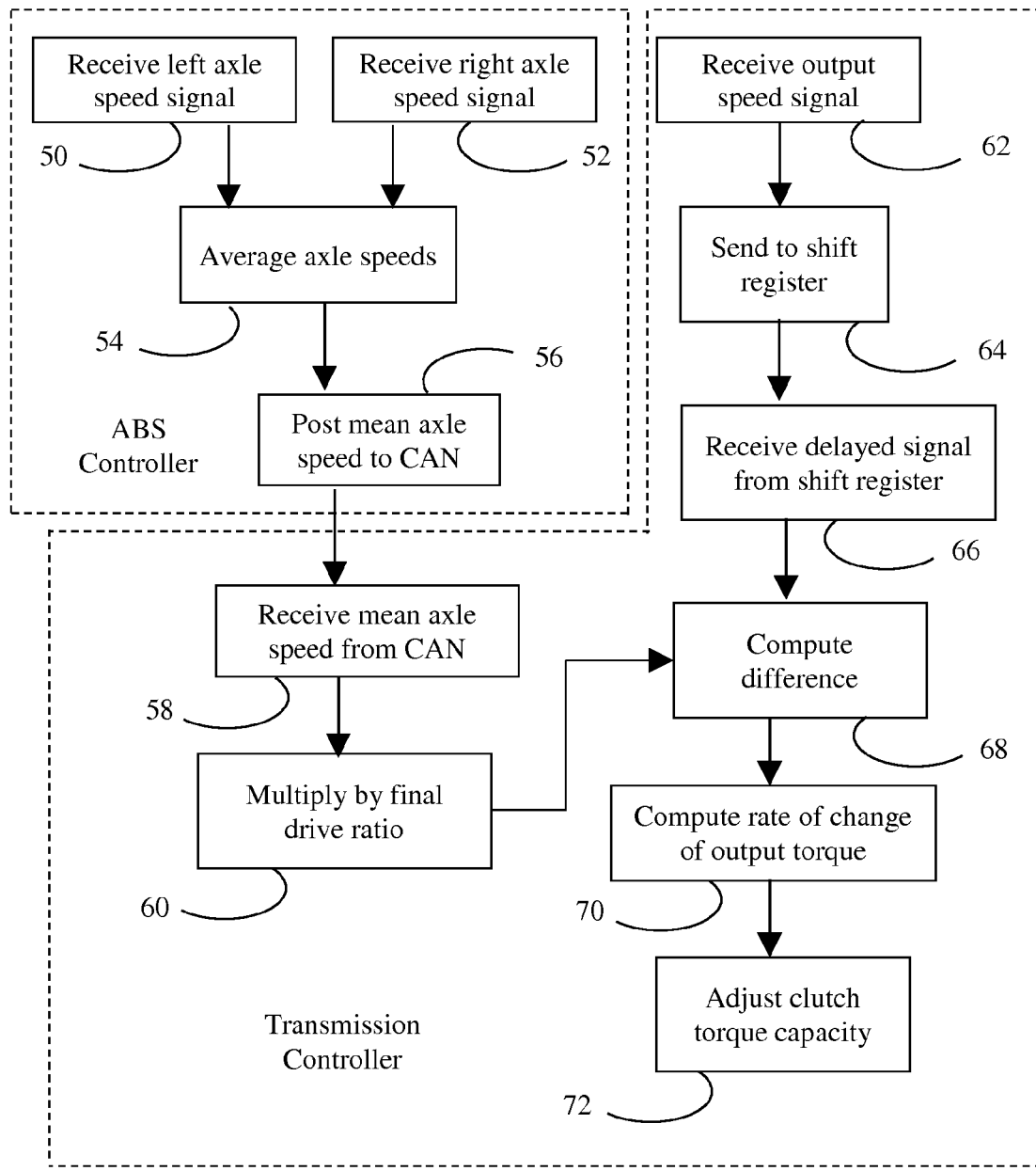
FIG. 2 is a flow chart illustrating a method of controlling a transmission clutch torque capacity based on an estimate of the rate of change of output torque.

The dotted lines in FIG. 2 indicate which controller performs each operation. However, several of the operations can be performed by either processor. If an operation is moved from one processor to the other processor, that impacts what information must be exchanged via the CAN. For example, if averaging of the left axle speed and right axle speed is performed by the transmission controller, then both axle speeds would be communicated via the CAN as opposed to the mean speed.

The communications bus introduces a transmission delay on the order of 10 ms. Therefore, the signal arriving at the transmission controller actually indicates the average rotational speed of the axles at some time in the past. On the other hand, the transmission controller receives information about the output shaft almost instantly. Comparing the speed of the output shaft at one point in time to the speed of the axle at an earlier point in time may lead to error in the computed rate of change of driveline torque. To compensate for the unequal delay, a shift register is utilized to delay the output shaft signal. The transmission controller receives a speed signal from sensor 34 at 62 and sends it to a shift register at 64. Then the transmission retrieves an earlier speed taken at substantially the same time as the speed signal received from the axle speed sensors from the shift register at 66. Taking the difference between these speeds at 68 and multiplying by the known driveline stiffness at 70 yields the rate of change of transmission output torque. At 72, the transmission controller adjusts the torque capacity of one or more clutches in response to the calculated rate of change of transmission output torque.

Figure 3:
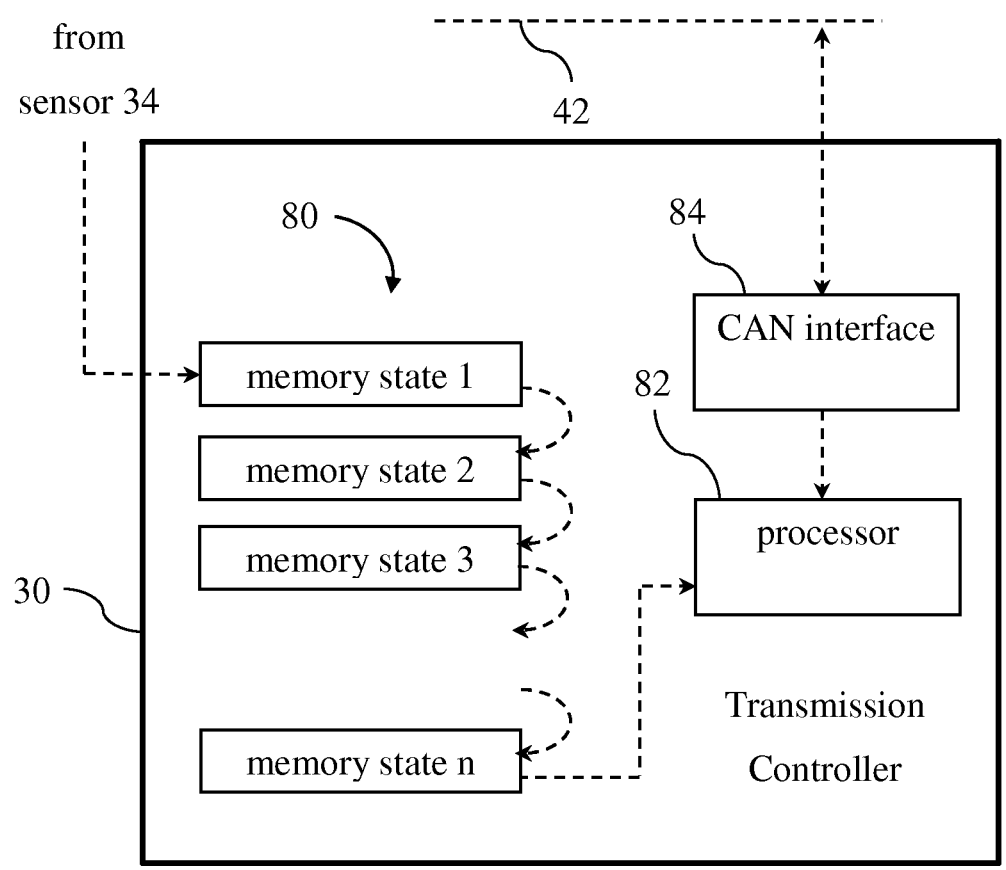
FIG. 3 is a schematic diagram of a controller including a shift register.

The controller is illustrated schematically in FIG. 3. Shift register 80 consists of a series of cascaded computer memory states, each storing a copy of the speed signal stored by the preceding memory state at the preceding time step. At each time step the values are copied from one state to the next. Processor 82 reads the value from memory cell n which contains a past reading, introducing a time delay equal to the number of memory state elements multiplied by the time step of the algorithm. Processor 82 obtains information from sensors 36 and 38 via the ABS controller 40, the CAN 42, and the CAN interface 84. By selecting the number of cells in the shift register properly, the delay of the shift register equals the delay in the axle sensor reading, reducing errors.

In some cases the delay in the axle speed signal also includes some delay introduced by filtering in ABS controller 40. This filtering delay typically correlates with the axle speed and is included to smooth the signal. To address this delay, shift register 80 can be constructed with a variable tap that changes the duration of the delay that it introduces according to the value of the axle speed signal. In other words, processor 82 may read from a different memory cell depending on the value. Alternatively, the reading from sensor 34 may be inserted into a different memory cell depending on the value.

Figure 4:
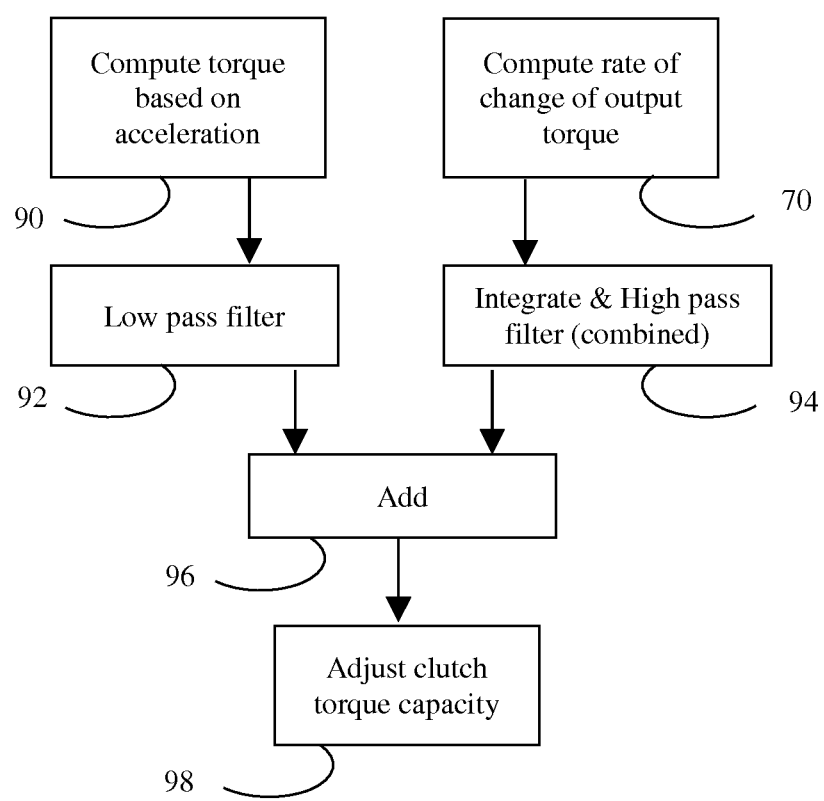
FIG. 4 is a flow chart illustrating a method of combining the estimated rate of change of output torque from FIG. 2 with an independent output torque estimate to yield a more accurate output torque estimate.

The method of FIG. 2 has the advantage that changes in transmission output torque are reflected quickly. Sometimes, however, it is desirable to adjust the clutch torque capacity based on the level of output torque instead of or in addition to the rate of change of output torque. Although output torque could theoretically be computed by numerically integrating the rate of change, such a method would be susceptible to gradual build-up of error. Also, it would require an initial estimate in order to supply the integration constant. These deficiencies are alleviated by combining the method of FIG. 2 with another method as illustrated in FIG. 4. At 90, transmission output torque is calculated using a method that accurately captures gradual changes in torque, such as the method based on vehicle acceleration described above. At 92, this estimate is passed through a low pass filter to remove any high frequency fluctuations. The rate of change estimate produced at 70 in FIG. 2 is integrated and passed through a high pass filter at 94. These operations can be combined as described below in a manner that alleviates the need for an initial estimate and avoids gradual error accumulation. The high pass filter retains the short duration fluctuations but attenuates the longer term fluctuations. These filtered estimates are added at 96 and used by the transmission controller at 98 to adjust the torque capacity of transmission clutches. Consequently, during transient conditions such as vehicle launch or a transmission shift, the controller responds to changes in output torque as indicated by the differential shaft speeds.

In a digital controller, a low pass filter can be implemented using the formula:

$$Y_i = Y_{i-1} * (\tau/(\tau+\Delta t)) + X_i * (\Delta t/(\tau+\Delta t))$$

where $Y_i$ is the filtered value at time step i, $X_i$ is the unfiltered value at time step i, $\tau$ is the time constant, and $\Delta t$ is the time between adjacent time steps. Similarly, a high pass filter can be implemented using the formula:

$$Y_i = Y_{i-1} * (\tau/(\tau+\Delta t)) + (X_i - X_{i-1}) * (\tau/(\tau+\Delta t)).$$

The last term in the above equation can be replaced by a term that uses the unintegrated speed difference computed at 68 in FIG. 2.

$$(X_i - X_{i-1}) = k * (\omega_{OS} - fd * \omega_{axle}) * \Delta t$$

where k is a constant based on driveline stiffness, $\omega_{OS}$ is the delayed output shaft speed from 66 in FIG. 2, $\omega_{axle}$ is the mean axle speed from 58 in FIG. 2, and fd is the final drive ratio. The integration and filtering are combined into the formula:

$$T_i = T_{i-1} * (\tau/(\tau+\Delta t)) + X_i * (\Delta t/(\tau+\Delta t)) + k * (\omega_{OS} - fd * \omega_{axle}) * \Delta t * (\tau/(\tau+\Delta t))$$

where $T_i$ is the torque estimate at time step i and $X_i$ is the unfiltered torque estimate based on vehicle acceleration at time step i as produced at 90 in FIG. 4.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain having a friction clutch configured to selectively establish a power flow path from an engine to an output shaft;
   an axle driveably connected to the output shaft through gearing having a gear ratio; and
   a processor programmed to adjust a torque capacity of the friction clutch based on a difference between a speed of the output shaft and a speed of the axle multiplied by the gear ratio.

2. The vehicle of claim 1 further comprising a communications bus and wherein the processor receives a signal indicating the speed of the axle from the communications bus.

3. The vehicle of claim 2 further comprising a shift register configured to delay a signal indicating the speed of the output shaft by a delay duration to compensate for a delay caused by the communications bus.

4. The vehicle of claim 3 wherein the shift register is configured to vary the delay duration in response to a command from the processor.

5. The vehicle of claim 1 wherein the processor alters the torque capacity of the friction clutch based on an integral of the difference between the speed of the output shaft and the speed of the axle multiplied by the gear ratio.

6. The vehicle of claim 5 wherein the processor filters low frequency content out of the integral of the difference between the speed of the output shaft and the speed of the axle multiplied by the gear ratio.

7. A transmission controller comprising:
   a shift register configured to delay a first signal indicating a transmission output speed by a delay duration to temporally coincide with a second signal indicating an axle speed, the second signal delayed by a communications bus; and
   a processor programmed to adjust a torque capacity of a clutch based on a difference between the delayed first signal and a product of a gear ratio and the second signal.

8. The transmission controller of claim 7 wherein the shift register is configured to vary the delay duration.

9. The transmission controller of claim 7 wherein the second signal indicates rotational speed of the axle without indicating rotational position of the axle.

10. A method comprising:

adjusting a torque capacity of a transmission clutch based on a difference between a first signal indicating a speed of a transmission output shaft and a product of a gear ratio and a second signal indicating a speed of an axle, wherein the axle is driveably connected to the transmission output by fixed ratio gearing having the gear ratio; and introducing a time delay in the first signal to compensate for a time delay receiving the second signal via a communications bus.

11. The method of claim 10 further comprising adjusting a duration of the time delay for the first signal based on variation in a duration of the delay for the second signal.

12. The method of claim 10 further comprising integrating the difference between the first signal and the product of the gear ratio and the second signal.

13. The method of claim 12 further comprising filtering low frequency content from the integral of the difference between the first signal and the product of the gear ratio and the second signal.

14. The method of claim 13 further comprising filtering high frequency content from an independent estimate of transmission output torque and summing the two filtered estimates.

* * * * *